United States Patent [19]

Van Dorn

[11] 3,994,545

[45] Nov. 30, 1976

[54] BEARING AND SEAL CONSTRUCTION

[75] Inventor: Horace B. Van Dorn, Kensington, Conn.

[73] Assignee: Textron, Inc., Providence, R.I.

[22] Filed: Dec. 23, 1975

[21] Appl. No.: 643,822

[52] U.S. Cl. ............................................. 308/187.1
[51] Int. Cl.² ....................................... F16C 33/78
[58] Field of Search............. 308/187.1, 187.2, 187, 308/36.1

[56] References Cited
UNITED STATES PATENTS

| | | | |
|---|---|---|---|
| 3,129,985 | 4/1964 | Watson | 308/187.1 |
| 3,752,544 | 8/1973 | Hay | 308/187.1 X L |
| 3,923,351 | 12/1975 | Frost | 308/187.1 |
| 3,936,105 | 2/1976 | Asberg | 308/187.1 |
| 3,944,305 | 3/1976 | Asberg | 308/187.1 |

Primary Examiner—Robert R. Song
Assistant Examiner—Gene A. Church
Attorney, Agent, or Firm—Hopgood, Calimafde, Kalil, Blaustein & Lieberman

[57] ABSTRACT

The invention contemplates a seal construction as for use between relatively rotating parts such as the inner and outer race rings of an antifriction bearing. In such an application, the end of the inner ring is rabbeted to define a cylindrical land and a generally frusto-conical shoulder near one axial end of the raceway, and the outer ring may be conventionally formed for swedged or crimped reception of an annular metal seal cap assembled thereto. The cap metal is formed with an inward skirt having radial-clearance relation of an axially outer portion of the land, and an elastomeric seal member is bonded to the axially inner face of the cap metal, at a location radially offset from the inner edge of the skirt. The seal member comprises a body to provide substantially axially inward offset for suspension of a seal lip, integrally formed with the body and projecting inwardly to an extent having interference with the land, so that when assembled to the land the lip is in axially extensive and circumferentially continuous light resiliently loaded running contact with the land, and so that the bend of the lip near connection with the body is in closely nested, inversion-protecting adjacency to the frusto-conical shoulder.

13 Claims, 4 Drawing Figures

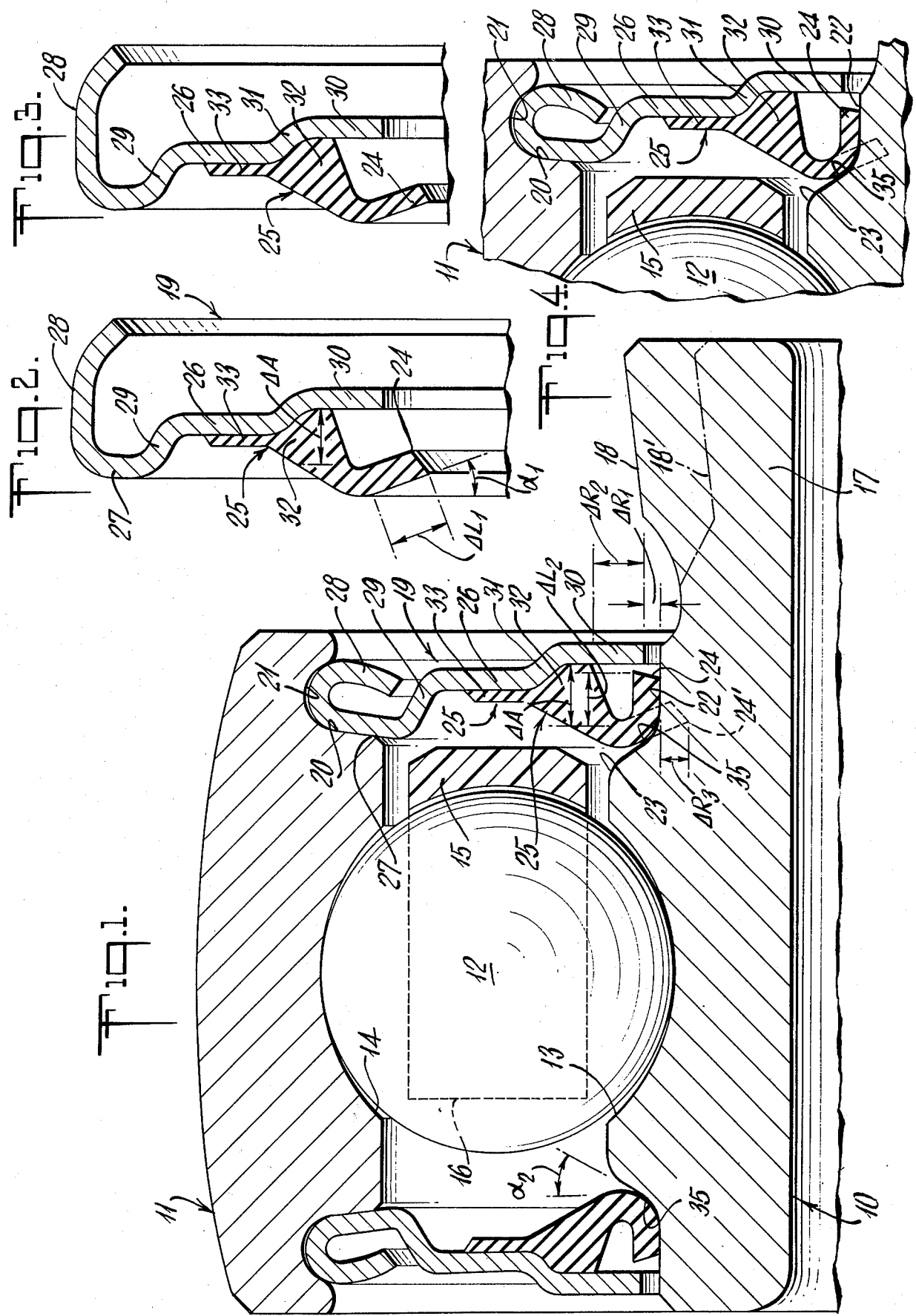

BEARING AND SEAL CONSTRUCTION

This invention pertains to seal mechanism for use between relatively rotating parts such as the inner and outer rings of an antifriction bearing.

It is an object of the invention to provide an improved bearing seal, for retention of bearing lubricant and for protection against entry of contaminants.

Another object is to provide a superior seal, which will accommodate end play and misalignment without losing seal effectiveness.

It is also an object to provide a superior seal, with low-drag characteristics and with protection against seal inversion.

A further object is to provide a seal meeting the above objects and inherently incapable of developing any pumping action or self-opening.

It is a general object to achieve the above objects at lower cost and with an inherent capability of accommodating a relatively bulky internal fitting, such as a plastic retainer for balls of a ball bearing.

Other objects and various further features of the invention will be pointed out or will occur to those skilled in the art from a reading of the following specification in conjunction with the accompanying drawings. In said drawings, which show, for illustrative purposes only, preferred forms of the invention:

FIG. 1 is a fragmentary longitudinal sectional view through a ball bearing incorporating seal features of the invention;

FIG. 2 is a vertical sectional view through a seal subassembly, as used in the bearing of FIG. 1;

FIG. 3 is a view similar to FIG. 2 to illustrate a modification; and

FIG. 4 is a fragmentary view similar to that at a sealed region of FIG. 1 but incorporating the modification of FIG. 3.

Referring to FIG. 1, the invention is shown in application to an antifriction bearing comprising inner and outer rings 10-11, with plural balls 12 riding the respective raceways 13-14 of rings 10-11. A one-piece injection-molded plastic retainer 14 with ball-engaging fingers 16 holds the balls in angularly spaced relation. The outer ring 11 is shown with a convex spherical outer surface, as for self-aligning use of the bearing to mount a shaft in the cylindrical bore of the inner ring 10. The inner ring 10 may be of extended length for set-screw locking to a shaft but is shown with an axially offset end 17 which is characterized by an outer eccentric conical surface 18, for accommodation of an eccentric locking collar (not shown); the phantom designation 18' will be understood to suggest this eccentricity by displaying the profile of surface 18 for the diametrically opposite location from that shown in solid outline in FIG. 1. Both ends of the bearing are closed and sealed by like cap structures 19 of the invention, and each of these is secured in a mounting recess characterized by an axially locating shoulder 20 and an undercut circumferential groove 21.

In accordance with the invention, the sealed ends of the inner ring 10 are rabbeted, to define at each sealed region an axially extensive cylindrical land 22 and a generally frusto-conical inner-end shoulder 23, near, but well offset from the adjacent end of the inner raceway 13, and the flexible lip 24 of an elastomeric seal-member part 25 of cap 19 is in circumferentially continuous and axially extensive sealing contact with land 22.

More specifically, the cap 19 comprises but two parts — a formed-metal member 26, and the seal member 25 bonded thereto. The reference character 26 has been applied to a central flat annular body region of the formed-metal member. Integrally formed with the formed-metal member is outer-ring mounting means in the form of an outer shoulder-locating face 27 and an outer crimping flange 28 (see FIG. 2 for these parts in their unsecured, i.e., undeformed or uncrimped, state; and a first frusto-conical connection 29 between the mounting means 27-28 and the central body region 26 provides a first axially outward offset of body region 26 with respect to the shoulder 20. The formed-metal member further includes a skirt 30 extending into relatively close clearance relation $\Delta R_1$ with an axially outer region of land 22; and a second frusto-conical connection 31 between skirt 30 and the central body region 26 provides a second axially outward offset of skirt 30 with respect to body region 26, and therefore also with respect to shoulder 20.

Also more specifically, the elastomeric member 25, which may be of Buna-N material directly molded to the formed-metal cap part, comprises an enlarged body 32 (with anchoring flange 33) continuously united to the inner face of offset connection 31 and to adjacent circumferentially continuous areas of the central body region 26 and of skirt 30, it being noted that the elastomeric body connection to skirt 30 is at a substantial radial offset $\Delta R_2$ from the radially inner edge of skirt 30. Further, the effective axial offset $\Delta A$ of lip 24 from skirt 30 exceeds, preferably to a relatively small extent, the effective projecting extent of lip 24; in FIG. 2, this effective extent is identified $\Delta L_1$ for the unstressed condition of lip 24, and in FIG. 1 it is identified $\Delta L_2$, being less than $\Delta L_1$ due to lip bending when stressed. As shown, the elastomeric body 32 tapers gradually to the axially offset point of lip 24 suspension, this point being preferably substantially at or within a geometrical cylinder at maximum radius of shoulder 23, thereby assuring that all lip flexure will occur within the radial confines of shoulder 23. Also, in FIG. 1, the phantom showing 24' of lip 24 in its unstressed condition illustrates my preference that the interference $\Delta R_3$ between land 22 and the unstressed lip (24') shall be at least in the order of magnitude of the thickness of lip 24. Still further, FIG. 2 illustrates my preference that lip 24 in unstressed condition shall be frusto-conically inclined, at an acute angle $\alpha_1$ to the radial plane of the bearing, and that in bent condition the curvature of the convex face of lip 24 shall be adjacent to and of slightly lesser radius than a concave fillet 35 by which shoulder 23 is faired to land 22. The unstressed lip angle $\alpha_1$ is also preferably less than the effective slope angle $\alpha_2$ of shoulder 23, the latter being in the range 10° to 50° and preferably near the lower end of such range.

The described structure lends itself to simultaneous grinding of the inner raceway 13 along with both lands 22 and their adjacent shoulder regions 23 and fillets 35. This may be performed in the plunge cut of a single form-wheel, and one is thereby assured of complete concentricity of the race, land and shoulder regions involved. In making this cut, the form-wheel will be understood to be profiled to provide correct lateral (i.e., axial) offsets of shoulders 23 from the central plane of raceway 13, so that a small residual nominal axial clearance or offset can be provided for the convex bent surfaces of lips 24 with respect to the filleted regions 35 of shoulders 23. Ordinarily, the assembled bearing will exhibit a degree of end play, typically 0.010 to 0.015 inch for a bearing as shown wherein the pitch circle of ball orbit is about 1.5 inches diameter; the indicated nominal axial clearance is preferably in this order, thereby assuring that lip-to-shoulder contact is a minimal significance under normal operation of the bearing.

The described structure will be seen to achieve all stated objects. Superior seal action results from lightly stressed lip contact over an axially extensive and circumferentially continuous area of each cylindrical land 22, and concentricity of simultaneously ground land and race surfaces assures uniform control of such contact while avoiding any condition which could lead to "pumping" action via the seal lip. Provision of shoulder 23 adjacent the bend of lip 24 establishes back-up protection against seal inversion. Moreover, the sealed bearing is highly adaptable to environmental end shake and misalignment, as will be understood.

In an illustrative and highly satisfactory specific embodiment of the invention, for example, for the 1.5-inch diameter ball-circle scale, the elastomeric material is in the durometer hardness range of 60 to 70, a standard-duty seal lip 24 is 0.024-inch thick and has an effective unstressed length $\Delta L_1$ of approximately 0.050 inch, and an effective stressed length $\Delta L_2$ of approximately 0.040 inch. The lip offset $\Delta A$ is 0.046 inch, and the radial clearance $\Delta R_1$ has a mean value of 0.013 inch.

While the invention has been described in detail for the preferred form of FIGS. 1 and 2, it will be understood that modifications are readily achieved without departure from the invention. For example, FIGS. 3 and 4 illustrate that principles of the invention lend themselves to design variation, as to provide lesser drag torque due to seal closure at 22–24. Since the parts of FIGS. 3 and 4 so closely correspond to those of FIGS. 1 and 2, they have been given the same reference numbers, and it will be observed that merely by reducing the thickness of lip 24, as from 0.024 inch to 0.014 inch for the illustrative bearing size, very substantially reduced drag torque is achieved, it being noted that essentially the same convex contour of the lip bend is achieved by having removed elastomeric material from the concave side of the lip 24.

What is claimed is:

1. An antifriction bearing comprising inner and outer rings having opposed raceways and antifriction elements riding said raceways, one end of the bore of said outer ring having a shouldered recess, and an annular metal cap secured in said recess and against said shoulder; the outer surface of said inner ring having at said end a circumferential rabbet formation extending axially inwardly and terminating in spaced relation to the inner-ring raceway, said rabbet formation being characterized by a cylindrical land terminating at its axially inner end with a generally frusto conical shoulder which flares outwardly in the direction of the inner-ring raceway, said cap integrally including a radially inward skirt which extends into clearance relation with an axially outer region of said land, and a unitary annular elastomeric seal member bonded to the axially inner side of said cap and including an axially inwardly offsetting body and a relatively thin radially inwardly projecting circumferentially continuous seal lip, said body being radially offset from said land to an extent greater than lip thickness, and said lip being of unstressed projecting extent less than the magnitude of body offset but having interference with said land to the extent of at least substantially the lip thickness, whereby said lip is axially outwardly bent and radially enlarged into uniform axially extensive and circumferentially continuous sealing contact with said land and within the body offset, the bent region of said lip being adjacent the flare of said inner-ring shoulder, whereby the flare of the inner-ring shoulder is not needed for seal effectiveness but protects the seal lip from inversion in the presence of externally applied pressure.

2. The bearing of claim 1, in which said body extends generally radially and axially inward and is tapered to juncture with said lip.

3. The bearing of claim 1, in which said body extends radially inward to substantially the outer radial limit of said inner-ring shoulder.

4. The bearing of claim 1, in which said lip is substantially wholly contained within a radially outer limit which does not exceed the outer radial limit of said inner-ring shoulder.

5. The bearing of claim 1, in which said lip is generally frusto-conical in unstressed condition, extending both radially inward and axially outward from juncture with said body.

6. The bearing of claim 1, in which the radial extent of said inner-ring shoulder is at least twice the lip thickness.

7. The bearing of claim 1, in which the durometer of said seal member is in the range 60 to 70.

8. The bearing of claim 1, in which the inner-ring shoulder is faired to said land with a curvature of effective radius exceeding the radius of the convex surface of the bend of said lip.

9. The bearing of claim 1, in which said cap is one of two, mounted to corresponding shouldered recesses at opposite ends of said outer ring and having seal members with lip engagement to the respective lands of corresponding rabbet formations on opposite sides of the inner-ring raceway, said rabbet formations and inner-ring raceway being the simultaneous product of a single form-wheel plunge cut.

10. The bearing of claim 1, in which the lip thickness exceeds cap clearance with said land.

11. The bearing of claim 1, in which said cap includes a central flat body portion and a frusto-conical offsetting connection thereof to said skirt, said seal-member body being in bonded overlap with said offsetting connection and with adjacent annular regions of said body portion and skirt.

12. The bearing of claim 1, in which said inner-ring shoulder is generally conically sloped in the range of 10° to 50° from a radial plane of the bearing.

13. As an article of manufacture, an end-seal cap for an antifriction bearing, said cap comprising a single annular metal part and a single annular elastomeric seal member concentrically bonded thereto; said metal part comprising a central flat annular body portion, cap-mounting means including an outer shoulder-locating face and an outer crimping flange, a first frusto-conical connection between said mounting means and said body and providing a first axially outward offset of said body with respect to said shoulder-locating face, a radially inwardly extending skirt, and a second frusto-conical connection between said body and skirt and providing a second axially outward offset of said skirt with respect to said body; said seal member comprising an axially inwardly offsetting annular body bonded to the axially inner surface of said metal part throughout said second frusto-conical connection and in bonded overlap with adjacent annular regions of said body portion and of said skirt, and a relatively thin radially inwardly projecting circumferentially continuous seal lip, the effective projecting extent of said lip substantially exceeding the lip thickness but being less than the effective offset of lip-connection to said seal-member body, whereby in assembly of said cap to the outer ring of an antifriction bearing having an inner ring with a land for which said seal-member body is radially offset from the land to an extent greater than lip thickness, said lip will be contained within the adjacent axially inner confines of said metal part.

* * * * *